United States Patent

Nyberg et al.

[11] Patent Number: 6,084,787
[45] Date of Patent: Jul. 4, 2000

[54] DEVICE FOR SUPERVISING IN A HIGH VOLTAGE CONVERTER STATION

[75] Inventors: Krister Nyberg, Smedjebacken; Roland Siljeström, Grängesberg; Hans Björklund, Ludvika; Urban Åström, Saxdalen; Gunnar Asplund, Ludvika, all of Sweden

[73] Assignee: ABB AB, Vasteras, Sweden

[21] Appl. No.: 09/230,947

[22] PCT Filed: Jun. 4, 1998

[86] PCT No.: PCT/SE98/01056

§ 371 Date: Apr. 29, 1999

§ 102(e) Date: Apr. 29, 1999

[87] PCT Pub. No.: WO98/57406

PCT Pub. Date: Dec. 17, 1998

[30] Foreign Application Priority Data

Jun. 11, 1997 [SE] Sweden .................. 9702222

[51] Int. Cl.[7] ............... H02H 7/00; H02H 7/125
[52] U.S. Cl. ............................. 363/51; 363/54
[58] Field of Search .................. 363/51, 54, 57, 363/96, 133, 85; 324/765; 340/660

[56] References Cited

U.S. PATENT DOCUMENTS 5,452,196  9/1995  Itoh ................................. 363/54
5,521,526  5/1996  Nyberg et al. ................... 324/765
5,684,465 11/1997  Andersson et al. ............... 363/54

FOREIGN PATENT DOCUMENTS 0 170 879 A1 12/1986 European Pat. Off. .
WO 93/11610 10/1993 WIPO .
WO 96/30994  3/1996 WIPO .

OTHER PUBLICATIONS

Abstract of JP 58-51769 A (Kansai Denriyoku K.K.), vol. 7, No. 136, Mar. 16, 1983.
Abstract of JP 57-91543A (Toshiba Corp.), Jul. 6, 1982.

Primary Examiner—Adolf Deneke Berhane
Assistant Examiner—Rajnikant B. Patel
Attorney, Agent, or Firm—Pollock, Vande Sande & Amernick

[57] ABSTRACT

A device for supervising different positions of a valve of a high voltage converter station located on a high voltage potential level comprises members arranged on a high voltage potential level and adapted to detect function parameters of the valve on a high voltage potential level and send values detected thereby to first control units for controlling the semiconductor components of the valve. The first control units have devices for processing the detected values and the first control units are adapted to utilize light conductors running back therefrom to a valve control unit for sending data resulting from the processing to an arrangement for supervising the valve located on a low potential level.

8 Claims, 2 Drawing Sheets

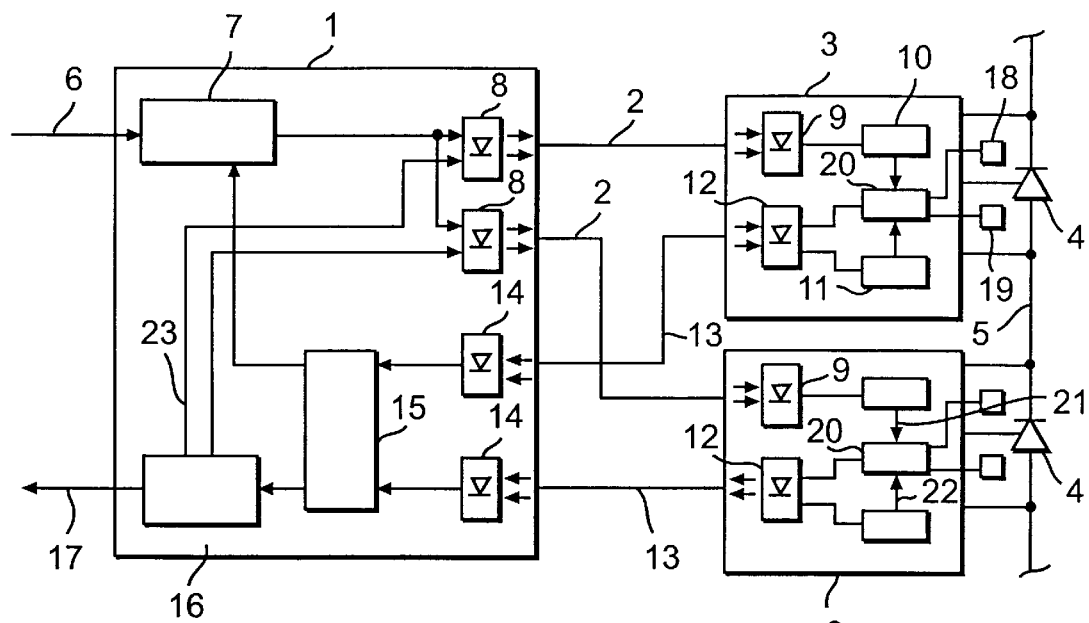
FIG. 1
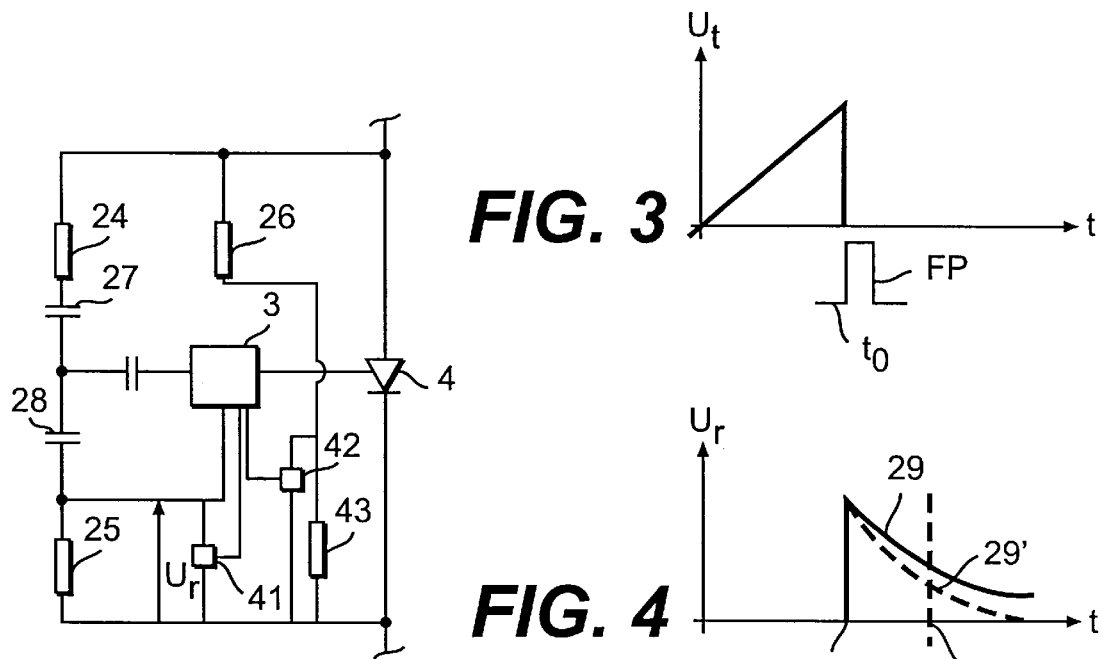
FIG. 2
FIG. 3
FIG. 4
FIG. 5

DEVICE FOR SUPERVISING IN A HIGH VOLTAGE CONVERTER STATION

FIELD OF THE INVENTION

The present invention relates to a device for supervising different positions of a valve of a high voltage converter station located on high voltage potential level and having a plurality of valve units each having at least one semiconductor component of turn-on-type and, for each semiconductor component, a first control unit located on high voltage potential level and controlling the component, the first control units being connected to a valve control unit located on a low potential level through light conductors for communication between the valve control unit and the first control-units while separating them galvanically.

Such high voltage converter stations may, for example, be stations in plants for transmitting electric power through High Voltage Direct Current (HVDC) for converting direct voltage into alternating voltage, and vice versa. However, the invention is not restricted thereto, but is directed to supervising all types of high voltage converter stations, in which high voltage typically may be voltages within the range 10–500 kV. Each valve unit usually has a plurality of semiconductor components of turn-on-type connected in series, such as thyristors, IGBTs or the like, which are controlled simultaneously, so that they act as one single switch, and among which the voltage to be held by the valve unit in a turned-off-state of the semiconductor components is distributed, since they normally only can hold 1–10 kV each.

High powers are handled by such a high voltage converter station and consequently, a failure of parts of, as of the entire station during a certain period of time generates high costs. Thus, it is an important goal to be able to supervise different positions of the valve so as to be able to take necessary measures, upon deviations from its normal state, for avoiding unplanned operation interruptions to the extent possible and to minimize the shutdown times for maintenance, by receiving information about exactly which components have a defect. Information about components with incipient deviations but not yet defective is also of interest for the foregoing reason, since corrective measures may be timely planned.

However, the different a fore-mentioned positions are located on a high voltage potential level, which makes the supervision thereof difficult, so that the way of proceeding has, until now, with respect to most of the positions, been restricted to carrying out a measurement of a parameter associated with the position in question on ground potential level, so as to then calculate a probable value of the parameter on high voltage potential level. An example of such a parameter is the temperature of the cooling water passing the semiconductor components for cooling thereof, in which this temperature has been determined indirectly by measuring the temperature of a cooling loop of the cooling system located on ground potential level, so as to calculate the temperature of the cooling water in the valve in question therefrom. It is natural that the accuracy will not be an optimum and that there are sources of faults making it possible to obtain values not at all corresponding to the reality. Furthermore, the determination is very inaccurate, since, for example, a very increased temperature of a single semiconductor component may not be determined, since this high temperature will have a minor influence upon the temperature of the cooling liquid in the loop on ground potential level.

It is also already known to supervise the very firing of the semiconductor component by sending an indication signal back from the first control unit through the light conductor to the valve control unit so as to indicate that the forward voltage across the semiconductor component is sufficient for a turning-on under favorable conditions. It is also already known to send a firing signal at one point of time to only one thyristor of a valve unit having a plurality of thyristors connected in series, and after that study the point of time for the arrival of the following indication pulses for the other thyristors from the respective first control units and compare them with the indication pulse coming from the thyristor, which at a separate point of time alone receives the firing signal. The indication pulse of the thyristor mentioned shall then, in a correct function, be delayed with respect to the other. It is otherwise indicated that no turning-on has taken place through the firing signal in question and as a result a fault is present.

None of these devices already known for supervising different positions of a valve of a high voltage converter station located on high voltage potential level gives, however, any possibility to reliably supervise the state of the valve in a satisfying manner when this is located on a high voltage potential level.

SUMMARY OF THE INVENTION

An object of the present invention is to provide a device, which improves the possibilities to check the state of such a valve considerably, and thereby avoid unnecessary breakdowns of components and unplanned operation interruptions.

This object is, according to the invention, obtained by providing a device which comprises members arranged on high voltage potential level and adapted to detect function parameters of the valve on a high voltage potential level and send values detected thereby to first control units, the first control units having means for processing the values detected, and the first control units being adapted to utilize light conductors running back therefrom to the valve control unit to send data resulting from the processing to an arrangement for supervising a valve located on a low potential level.

By arranging an increased intelligence on a high voltage potential level in this way, i.e. in the first control units for controlling the semiconductor components, and utilizing the light conductors already there for sending data resulting from the processing by the processing means to the supervising arrangement located on a low potential level, a reliable supervision of the different positions of such a valve may be ensured through simple means, resulting in lowered costs and further resulting in a good picture of the state of the valve. By carrying out the measurements on a high voltage potential level the parameters in question are measured exactly where the value thereof is of interest, whereby sources of faults are reduced to a minimum. Furthermore, no additional arrangements for bringing the values in question down to "the ground" are required, since the light conductors already present are used for this purpose while obtaining a galvanic separation required between high voltage potential level and low potential level. The only thing required is that the first control units are supplemented by the means and that the different measuring members are applied in different places and connected to the first control unit, which may take place through conductors of electricity.

An arbitrary number of positions may, according to the invention, in this way be measured for a valve located on a high voltage potential level and information related thereto may be transmitted to a low potential level through the first control units and light conductors. Such positions may be the temperature of the cooling medium for cooling the semiconductor components, the functioning of voltage division across the semiconductor components and, thus, the function of different components being parts of the voltage dividing circuit and so on.

According to a preferred embodiment of the invention the detecting members are adapted to detect the function parameters at each individual semiconductor component and send the values detected to the first control unit of the semiconductor component. The state in the region of each individual semiconductor component of the valve may thus be efficiently supervised, so that possible deviations from different values desired of the parameters may be discovered early and suitable measures may be rapidly taken so as to minimize the number of breakdowns of components, operation interruptions and the like. Thus, a fault of a given position of a quite particular semiconductor component is discovered in place, i.e. on a high voltage potential level, without any erasing of any information about such a fault by the good function of a number of other such semiconductor components or by the distance between the high voltage potential level and the low voltage potential level.

According to another preferred embodiment of the invention, which is applicable to a device for supervising in a valve having an arrangement for cooling the semiconductor components with a cooling block associated with the respective semiconductor component and adapted to absorb heat from the semiconductor component and transmit it to a cooling medium, the device comprises temperature detecting members arranged at least some of the cooling blocks and adapted to send values detected thereby to the first control unit associated with the respective semiconductor component for elaborating and transmitting data concerning the temperature of the cooling block to the supervising arrangement. By measuring the temperature in the different cooling blocks on a high voltage potential level and directly in the vicinity of the semiconductor components it will be possible to arrive at very reliable conclusions with respect to the temperature of the semiconductor components, which enables an elimination of a part of the protection systems for supervising cooling medium in high voltage converter stations already known and improving the accuracy of these systems.

According to a preferred embodiment of the invention, which constitutes a further development of the embodiment last mentioned, the temperature detecting members are arranged in each cooling block for temperature detection at each semi-conductor component of the valve. The temperature increase locally in any of the semiconductor components may thus efficiently be detected with a short delay, so that measurements required, such as for example refiring of a semiconductor component not turned on or the like, may be taken so as to reduce the power dissipation in the semiconductor component in question, disconnecting thereof or other measures may be taken before an activation of an over-current protection present.

According to another preferred embodiment of the invention, which is applicable to a valve in which the semiconductor components are arranged in stacks and in which shelf-like shields are arranged between superimposed semiconductor components for preventing the transfer of fire between the semiconductor components, and an arrangement is arranged to circulate a cooling liquid passing the semiconductor components for cooling thereof, the fire shields are adapted to trap cooling liquid possibly leaking from the cooling arrangement, and members are arranged at least some of the fire shields to detect cooling liquid received thereon and send information related thereto to the first control unit in question so as to, after processing, send data concerning the leakage of the cooling system indicated further to the supervising arrangement of the valve.

By utilizing such fire shields already existing in the valve for trapping cooling liquid possibly leaking from the cooling arrangement and arranging the members on a high voltage potential level at the fire shields, the existence and the position of a leakage of cooling liquid may be determined early for taking measures required before the components break down. The supervising of this position of the valve therefore also becomes very cost efficient.

According to another preferred embodiment of the invention the fire shields have a recess with a small surface with respect to the surface of the fire shield for conducting cooling liquid trapped by the fire shield down thereinto, and the member is formed by a level indicator arranged in the recess and adapted to send a signal indicating a leakage to the respective first control unit when cooling liquid collected in the recess reaches a predetermined level. A local minor leakage of cooling liquid may thus be discovered very early.

According to another preferred embodiment of the invention, which is applicable to a valve of line commutated type and in which the semiconductor components are thyristors, and across each thyristor a voltage divider circuit consisting of resistances and capacitors are connected, the capacitors of the voltage divider circuit are of so-called self-healing type, in which the capacitance decreases gradually as of the point of time for occurring of a possible defect thereof. The first control unit associated with the respective thyristor is arranged to register the voltage across the thyristor through a member through a first resistance of the voltage divider at an instant immediately before the turning-on of the thyristor and, thereby short-circuiting of the capacitor of the voltage divider. A member registers the voltage across a second resistance in the voltage divider circuit at a given point of time after the instant. The means are adapted to calculate a value of the capacitance of the capacitor of the voltage divider on the basis of the values of these two voltages and send information depending thereupon through the light conductors to a supervising arrangement, and the members are adapted to compare the capacitance value with a rated value of the capacitance and the supervising arrangement is arranged to determine whether a fault has occurred in the voltage divider on the basis of this comparison. By utilizing information about the voltage across the resistances present on a high voltage potential level a possible defect of the voltage divider circuit in question may reliably be detected in the supervising arrangement on "ground level". Thus, this may take place by combining the voltage measurement with a use of so-called self-healing capacitors with defined properties.

According to a preferred embodiment of the invention, which constitutes a further development of the embodiment last mentioned, the supervising arrangement is adapted to determine that a capacitor fault has occurred when a capacitance value calculated falls below the rated value by a given proportion. Thus, a capacitor fault of the voltage divider circuit may be detected in this through the comparison.

According to another preferred embodiment of the invention the supervising arrangement is adapted to determine that a resistance fault has occurred when a capacitance value calculated exceeds the rated value by a given proportion. Thus, if the capacitance value calculated quite suddenly exceeds the rated value by a given proportion it may not be a question of any fault in the capacitor any longer, but the resistance has then instead become too high. The probability for a simultaneous occurrence of a resistance fault and a capacitor fault and that these two faults would balance each other is very low.

Further advantages as well as advantageous features of the invention appear from the following description and the other dependent claims.

BRIEF DESCRIPTION OF THE DRAWINGS

With reference to the appended drawings, below follows a description of preferred embodiments of the invention cited as examples.

In the drawings:

FIG. 1 is a simplified diagram illustrating the principle of the function of a device according to a preferred embodiment of the invention, FIG. 2 is a voltage divider circuit of a part of a device according to preferred embodiment of the invention, FIG. 3 is a graph Illustrating the development of the voltage across the thyristor, with which the voltage divider circuit in FIG. 2 is associated, before and after turning the thyristor on, FIG. 4 is a graph illustrating the development of the voltage across a resistance of the voltage divider circuit according to FIG. 2 over the time after turning the thyristor on, FIG. 5 is a graph illustrating the development of the capacitance of a self-healing capacitor over the time from the point of time for the occurrence of a fault of the capacitor.

DETAILED DESCRIPTION OF PREFERRED EMBODIMENTS OF THE INVENTION

Figure 6:
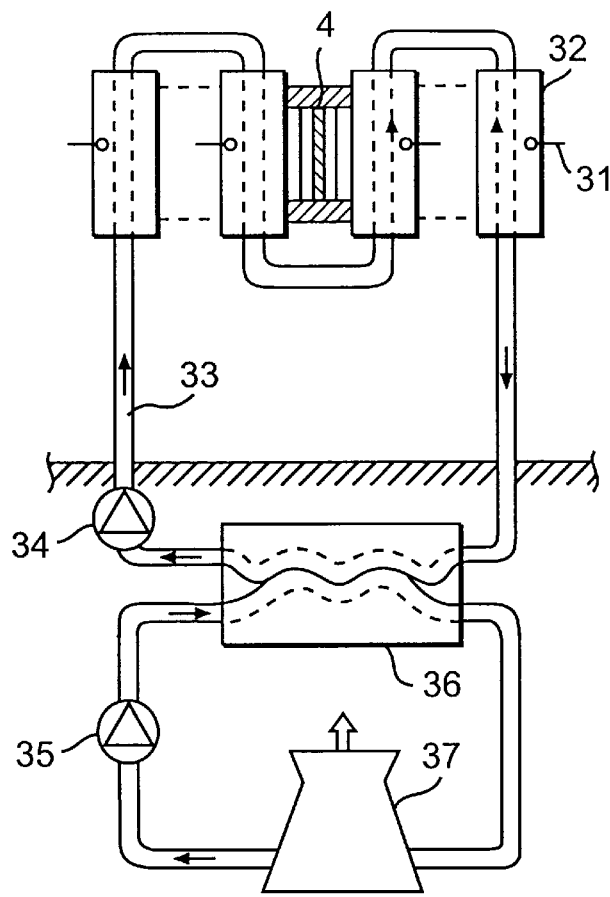
FIG. 6 is a diagram illustrating how the cooling of semiconductor components of a valve may take place and how according to the invention the temperature of the cooler may be determined.

The general construction of a valve of a high voltage converter station, for example for converting High Voltage Direct Current (HVDC) into alternating current and vice versa, and a valve control unit associated therewith, are schematically illustrated in FIG. 1, as well as schematically how the invention may be realized. A valve control unit 1 is in the converter station adapted to communicate through light conductors 2, i.e. opto-cables, with control units 3 for controlling semiconductor components 4 of turn-on type belonging to the valve units, such as thyristors, in which the controlling then only relates to turning on, and IGBTs, in which the controlling then also comprises turning off. A greater number of such semiconductor components are usually connected in series within one single valve unit and intended to be each controlled simultaneously through a control unit 3, which is indicated through the dashed line at 5. A valve consists in its turn of a plurality of such valve units. We will for the sake of simplicity in the now following description assume that the semiconductor components consist of thyristors, which may not be turned off, although the invention is not in any way restricted thereto.

The valve control unit 1 is located on a low voltage potential level, i.e. on earth, and it receives in a conventional way a control pulse through an input 6 to a logic circuit 7 for normal turning-on or firing, which sends a turn-on or firing signal further to different light-emitting diodes 8 so as to make the light conductors to send firing signals to all the thyristor control units 3 belonging to the valve unit. The thyristor control units have light emitting diodes 9 adapted to receive the firing signals and through a firing circuit 10 act upon the gate of the thyristor 4 for taking care of a turning-on of the thyristor. The thyristor control unit has in a conventional way also a circuit 11 for sending an indication pulse to light emitting diodes 12 and further through light conductors 13 to photo diodes 14 of the valve control unit so as to indicate that the voltage across the thyristor in question in the forward biased direction thereof is sufficient for making a turn-on possible to take place rapidly and efficiently with low power losses during the firing step.

The indication pulses go further through a logic circuit 15, the function of which will be explained further below, to the circuit 7 so as to control the sending of a firing pulse thereby. The valve control unit 1 has also a logic circuit 16 for supervising the different positions of the valve for sending them from the valve control unit through a supervising bus 17.

Except from the particular arrangement of the circuits 15 and 16 the features described above are part of the prior art. The characterizing features of the invention will now be described.

The supervising device comprises members 18, 19 schematically indicated adapted to detect function parameters of the valve on a high voltage potential level and to send values detected thereby to the thyristor control units 3. Such members are here arranged in the vicinity of each of the thyristors. Furthermore, the device has means 20 belonging to the thyristor control unit adapted to process the values detected by the members 18 and 19. The means 20 are connected to the light-emitting diodes so as to send information resulting from the processing through the light conductors 13. This means 20 is constituted by a micro computer with a low consumption of power, which receives measurement values from the members 18 and 19 and after processing thereof sends codes out on the light conductors 13. The sending of this information is then preferably synchronized with the sending of firing and/or indication pulses, which is indicated by the arrows 21, 22. The signals coming from the light conductors 13 to the valve control unit are filtrated in the logic circuit 15 for indication pulses, so that the indication pulses are sent on to the circuit 7 while the data emanating from the means 20 are sent further to the supervising arrangement 16 for a suitable treatment therein.

The supervising arrangement has also an output 23 connected to the light conductors 2 through the light emitting diodes 8 for sending messages to the thyristor control units 3, such as for example additional firing pulses so as to check the function of the different thyristors.

The advantages of a device according to the invention have been discussed thoroughly above, and some preferred embodiments shall now be described.

The voltage divider circuit arranged across the thyristor 4 of the valve unit is illustrated in FIG. 2, the circuit consisting of resistances 24, 25 and capacitors 27, 28 connected in series for obtaining a dynamic voltage division. The capacitors 27, 28 have together a capacitance C and the resistors 24, 25 have together a resistance R, so that the circuit in question gives a well-defined time constant RC. Furthermore, resistors 26 and 43 are arranged for static voltage division. Faults in the voltage-divider circuit may lead to thyristor breakdown if they are not discovered early. The present invention is adapted to do this and is based on the fact that the capacitors 27, 28 are capacitors of so-called self-healing type, which means that they will not be destroyed instantaneously upon an occurrence of a fault. Rather, the capacitance thereof is gradually reduced from the point of time of the occurrence of the fault, so that the time constant of the circuit is reduced thereby. This fact is utilized according to the invention by measuring the current through the voltage divider at two different points of time $t_0$ and $t_1$. More exactly, this is made at a first point of time corresponding to the point of time for the firing of the thyristor and at a second point of time $t_1$ located later in the time, for example about 100 micro seconds after the first point of time. Members for measuring voltage are illustrated by the blocks 41 and 42, but there are in practice no separate members therefor, but the thyristor control unit has continuous knowledge about the magnitude of $U_r$ and $U_t$. It is illustrated in FIG. 3 how the voltage $U_t$ across the thyristor 4 increases in the forward biasing direction thereof to the point of time $t_0$ for receiving a firing signal FP, in which it falls to approximately zero. The RC-circuit is short-circuited at the firing and the capacitors 27 and 28 are discharged through the resistors 24 and 25, so that the current I through the circuit will sink according to the formula:

$$I(t) = I(t_0)e^{-\frac{(t-t_0)}{RC}} \quad (1)$$

where R is constituted by the resistances 24 and 25 and C is the total capacitance for the capacitors 27 and 28.

$1(t_0)$ results from $$\frac{ut_0}{R},$$

since the voltage across the capacitors is at the time $t_0$ very close to the voltage across the thyristor, i.e. $Ut_0$, so that the value for $Ut(t_0)$ is obtained by the measuring member 42 as the thyristor voltage exactly before the instant of firing.

A value of $1(t)$ is obtained through the voltage Ur through the relation $$I(t) = \frac{Ur(t)}{R}$$

Introducing the voltage at the point of time $t_1$ results in the following expression for the total capacitance of the capacitors 27 and 28:

$$C = \frac{t_1 - t_0}{\left[\ln\left(\frac{Ut(t_0)}{U_r(t_1)}\right)\right]R} \quad (2)$$

It is illustrated in FIG. 4 by the line 27 how the voltage $U_r$, develops for the perfect voltage divider circuit. However, should a fault occur in any of the capacitors the overall capacitance will sink from the moment of occurrence of the fault at the point of time zero according to the curve shown in FIG. 5. This means that the voltage $U_r$ will sink more rapidly than for an intact voltage divider circuit, as indicated by the dashed curve 29' in FIG. 4. A lower value of the capacitance will thus be determined through the formula (2). Members are arranged in the thyristor control unit 3 for comparing the capacitance value calculated in this way with a rated value of the capacitance, and register a capacitor fault when the capacitance value calculated falls below the rated value by a given proportion, which is indicated by the line 30 in FIG. 5, and to send such information through the light conductors 13 (see FIG. 1) to the supervising arrangement of the valve control unit.

However, if a fault occurs in any of the resistors 24, 25, 26 or 43, so that the resistances thereof are changed considerably, the capacitance value calculated will then instead deviate from the rated value-by a given proportion, by which a resistance fault is determined after the comparison has been carried out and information related thereto is sent to the supervising arrangement. This information sent to the supervising arrangement makes it possible to take decisions to replace the capacitor or the resistor before the thyristor is destroyed.

Another possible way to determine the RC-time is to measure the time between two voltage levels. The voltage across R gives a measuring value of $I_r$. When the voltage $U_r$, across the resistor at any time after the time $t_0$ sinks below a first voltage $U_1$, the comparator starts a clock, which stops when a lower level $U_2$ is passed at the time $t_1$. The time $\Delta t = t_1 - t_0$ gives a value of the time constant, which is compared to a reference value. A too small $\Delta t$ indicates that the capacitor is broken.

However, the measurement has to be synchronized with the firing pulse, so that the measurement is carried out only about 100–200 μs after firing. This is important because there will be pulses and transients across the resistance during the interval when the thyristor is not conducting, and these pulses result in erroneous curve shapes, since they are not capacitor dischargings but transients produced when other valves in the bridge commutate.

A device according to another preferred embodiment of the invention is schematically illustrated in FIG. 6, and members 31 schematically indicated are arranged therein so as to detect the temperature of the respective cooling block 32, normally made of aluminum, surrounding the semiconductor component 4 in question for cooling thereof through a cooling medium, normally water, circulating through the cooling block through conduits 33. The cooling blocks and the cooling conduit 33 are parts of a cooling arrangement, which is designed in a conventional way and contains pumps 34, 35, heat exchangers 36 and a cooling tower 37 cooled by air. The members 31 are adapted to send values detected thereby to the first control unit 3 associated with the respective semiconductor component for elaborating and transmitting data with respect to the temperature of the cooling blocks to the supervising arrangement. The supervising arrangement may thus receive reliable data with respect to cooling temperature at the respective semiconductor component so that a temperature increase thereof may be registered rapidly and suitable measures be taken.

Figure 7:
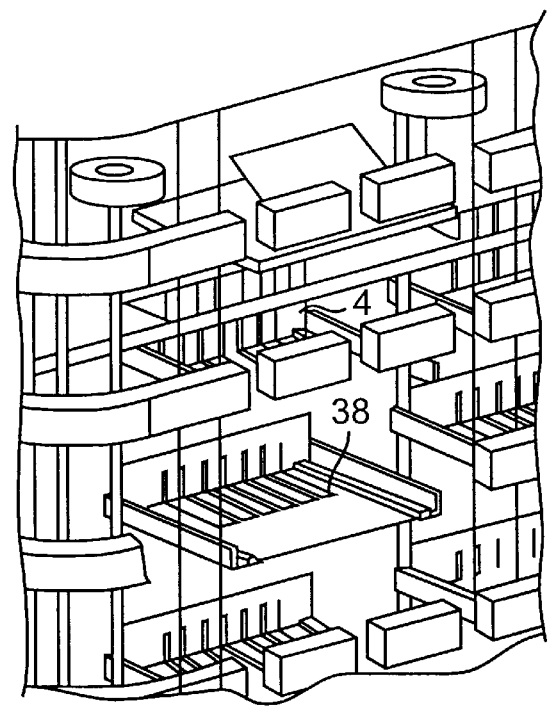
FIG. 7 is a simplified view of a part of a valve in which semiconductor components are arranged in stacks, in which some parts have been broken away so as to illustrate fire shields arranged between superimposed semiconductor components.
Figure 8:
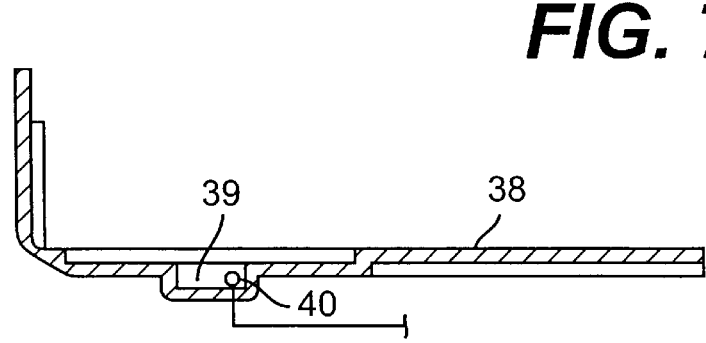
FIG. 8 is an enlarged side-elevation of a fire shield with cooling liquid leakage indicator shown in FIG. 7.

A part of a device according to a third preferred embodiment of the invention is illustrated in FIG. 7, in which the semiconductor components 4 are arranged in stacks, and shelf-like shields 38 are arranged between superimposed semiconductor components for preventing transfer of fire between the semiconductor components. A package of a number of semiconductor components connected in series is here arranged above each shield. A fire shield 38 according to a preferred embodiment of the invention is illustrated in FIG. 8. The fire shield is adapted to trap cooling liquid possibly leaking from an arrangement adapted to circulate cooling liquid passing the semiconductor component for cooling thereof and therefore has a recess 39 with a small surface with respect to the surface of the fire shield for conducting cooling liquid trapped by the fire shield down thereinto. A member 40 in the form of a level indicator is arranged in the recess to send a signal telling about a leakage to the respective first control unit 3 when cooling liquid collected in the recess reaches a predetermined level. The supervising arrangement may in this way be informed about the existence of cooling water leakage of the valve and where in the valve the leakage is located.

Other supervising functions that may be carried out through a device according to the invention are for example

- local fire, smoke and/or gas detection with information to ground,
- measuring the on-voltage drop for indirectly determining the silicon temperature in the semiconductor component through the resistor 26,
- measuring the blocking voltage of each semiconductor component for determining the voltage distribution within the valve through the resistance 26 synchronized with FP.

The invention is of course not in any way restricted to the preferred embodiments described above, but a number of possibilities for modifications thereof would be apparent to a man skilled in the art without departing from the basic idea of the invention as defined in the claims.

It is emphasized that the different preferred embodiments described above may and should also be combined with each other so as to obtain an optimum supervising of the state of the valve. However, any of these may in quite particular applications be omitted, but it would also be possible to supplement the different detecting members with members for detecting other function parameters of the valves.

With respect to the comparing members in the embodiment for checking the voltage divider circuit it is pointed out that the claims are intended to comprise both an arrangement thereof in the first control unit and on a low voltage potential level, for example in the valve control unit.

We claim:

1. A device for supervising different positions of a valve of a high voltage converter station located on a high voltage potential level and having a plurality of valve units each having at least one semiconductor component of turn-on-type and for each semiconductor component a first control unit located on a high voltage potential level and controlling the component, said first control units being connected to a valve control unit located on a low potential level through light conductors for communication between the valve control unit and the first control units while separating them galvanically, said device comprising members arranged on a high voltage potential level and adapted to detect function parameters of the valve on a high voltage potential level and to send values detected thereby to said first control units, the first control units having means for processing said detected valves, and the first control units being adapted to utilize light conductors running back therefrom to the valve control unit to send data resulting from said processing to an arrangement for supervising said valve located on low potential level;

wherein said semiconductor components are arranged in stacks and shelf-like shields are arranged between semiconductor components superimposed for preventing a transfer of fire between said semiconductor components, and wherein an arrangement is arranged for circulating a cooling liquid passing the semiconductor components for cooling thereof, wherein said fire shields are designed to trap cooling liquid possibly leaking from said cooling arrangement, and members are arranged at least some of the fire shields to detect cooling liquid received thereon and to send information related thereto to the first control unit in question so as to send, after processing, data concerning the leakage of the cooling system indicated further to the supervising arrangement of the valve.

2. A device according to claim 1, wherein the fire shields have a recess with a small surface with respect to the surface of the fire shield for conducting cooling liquid trapped by the fire shield down thereinto, and said member is formed by a level indicator arranged in said recess and adapted to send a signal indicating a leakage to the respective first control unit when cooling liquid collected in the recess reaches a predetermined level.

3. A device according to claim 1, wherein said cooling liquid is water.

4. A device according to claim 1, wherein each fire shield of the valve is provided with members for detecting cooling liquid received on the shield.

5. A device for supervising different positions of a valve of a high voltage converter station located on high voltage potential level and having a plurality of valve units each having at least one semiconductor component of turn-on-type and for each semiconductor component a first control unit located on a high voltage potential level and controlling the component, said first control units being connected to a valve control unit located on a low potential level through light conductors for communication between the valve control unit and the first control units while separating them galvanically, said device comprising members arranged on a high voltage potential level and adapted to detect function parameters of the valve on a high voltage potential level and to send values detected thereby to said first control units, the first control units having means for processing said detected values, and the first control units being adapted to utilize light conductors running back therefrom to the valve control unit to send data resulting from said processing to an arrangement for supervising said valve located on low potential level; and wherein the valve includes an arrangement for cooling said semiconductor components with a cooling block associated with the respective semiconductor component and arranged to absorb heat from the semiconductor component and to transfer heat to a cooling medium, and wherein the device comprises temperature detecting members arranged at at least some of said cooling blocks and adapted to send values detected thereby to the first control unit associated with the respective semiconductor component for elaborating and transmitting data concerning the temperature of said cooling block to said supervising arrangement.

6. A device according to claim 5, wherein said temperature detecting members are arranged in each cooling block for temperature detection at each said semiconductor component of the valve.

7. A device for supervising different positions of a valve of a high voltage converter station located on a high voltage potential level and having a plurality of valve units each having at least one semiconductor component of turn-on-type and for each semiconductor component a first control unit located on a high voltage potential level and controlling the component, said first control units being connected to a valve control unit located on a low potential level through light conductors for communication between the valve control unit and the first control units while separating them galvanically, said device comprising members arranged on a high voltage potential level and adapted to detect function parameters of the valve on a high voltage potential level and to send values detected thereby to said first control units, the first control units having means for processing said values detected, and the first control units being adapted to utilize light conductors running back therefrom to the valve control unit to send data resulting from said processing to an arrangement for supervising said valve located on low potential level; and wherein said valve is of line commutated type and said semiconductor components are thyristors, and wherein a voltage divider circuit consisting of resistances and capacitors is connected across each thyristor, the capacitors of the voltage divider being of a self-healing type, and the capacitance decreases gradually as of the point of time for occurring of a possible defect thereof, wherein the first control unit associated with the respective thyristor is arranged to register the voltage across the thyristor through a first member through a first resistance of the voltage divider at an instant immediately before the turning-on of the thyristor and thereby short-circuiting of the capacitor of the voltage divider, and through a second member register the voltage across a second resistance in the voltage divider circuit at a given point of time after said instant, said means being adapted to calculate a value of the capacitance of the capacitor of the voltage divider on the basis of said values of the two voltages and to send information depending thereupon through said light conductors to a supervising arrangement, and wherein said members are adapted to compare said capacitance value with a rated value of said capacitance and the supervising arrangement is arranged to determine whether a fault has occurred in the voltage divider on the basis of the comparison.

8. A device according to claim 7, wherein said first member is adapted to register said voltage at a given instant corresponding to the point of time for the turning-on of the thyristor in question through the first control unit associated therewith.

* * * * *